Feb. 18, 1964    H. L. BAUMBACH ETAL    3,121,786
AUTOMATIC CONTROL SYSTEM

Original Filed Sept. 1, 1955    2 Sheets-Sheet 1

INVENTORS.
HARLAN L. BAUMBACH
HOWARD M. LITTLE
BY
Barry L. Clark
ATTORNEY

Feb. 18, 1964 H. L. BAUMBACH ETAL 3,121,786
AUTOMATIC CONTROL SYSTEM
Original Filed Sept. 1, 1955 2 Sheets-Sheet 2

INVENTORS.
HARLAN L. BAUMBACH
BY HOWARD M. LITTLE
Barry L. Clark
ATTORNEY.

United States Patent Office 3,121,786
Patented Feb. 18, 1964

3,121,786
AUTOMATIC CONTROL SYSTEM
Harlan L. Baumbach and Howard M. Little, Los Angeles, Calif., assignors, by mesne assignments, to Bell & Howell Company, a corporation of Illinois
Original application Sept. 1, 1955, Ser. No. 531,879, now Patent No. 2,935,923, dated May 10, 1960. Divided and this application May 26, 1958, Ser. No. 737,964
5 Claims. (Cl. 235—61.6)

This invention relates to electrical control systems, and more particularly to an improved automatic electrical control system for effecting periodic, pre-selected operation of a plurality of controlled elements.

This application is a division of our co-pending application, Serial No. 531,879, now Patent No. 2,935,923 filed September 1, 1955, and entitled Automatic Photographic Printing Machine.

Briefly stated, automatic control systems of the type to which this invention pertains are equipped with a control member which may be preset with sets of control information each corresponding to a preselected one or preselected ones of the controlled elements, a sensing device for sensing the sets of control information, means for relatively advancing the preset control member and sensing device past one another to successively align the control sets with the sensing device, and a control circuit between the sensing device and controlled elements for selectively operating the latter in accordance with the control information contained in the control sets.

One type of control member which is widely used in automatic control systems of this nature consists of a tape, the control sets of which comprise coded sets of control indications, such as perforations. Generally, these control tapes have a blank leader portion preceding the first coded control set.

In order to condition the control system for operation, it is necessary to initially feed this leader portion of the tape past the tape reader to align the first control set with the reader. To the end of facility and speed of operation of the control system, it is highly desirable to accomplish this initial advancing of the control tape, or other control member having a blank leader, automatically. Moreover, since the control system is not conditioned for proper operation until this initial advancing of the control member is completed, the control system is preferably provided with interlock means for deactivating the controlled machine until the first control set is aligned with the reader.

Sensing operation of tape sensing devices generally involves the selective establishment of one or more electrical contacts, each corresponding to a particular controlled element, in accordance with the control information in the control sets. The controlled elements, in turn, are operated in response to the establishment of their respective contacts.

In the existing control systems, these contacts are, in most cases, in direct circuit with the controlled elements. This arrangement possesses an inherent disadvantage which is especially serious in certain applications, such as in the illustrative use of the present control system for controlling printing light intensity in a film printer.

Thus, with such a direct circuit arrangement, preselected actuation of the controlled elements, in accordance with the control information of a particular control set, is interrupted in the event of failure of a contact. Further, during relative advancing of the control member from one control set to the next, all of the sensing contacts are interrupted. Accordingly, all of the controlled elements become momentarily deactivated.

It is desirable, therefore, that the control systems embody some type of "memory" system between the sensing device and controlled elements for maintaining the preselected actuation of the controlled elements corresponding to each control set during relative advancing of the control member to the next control set as well as in the event of failure of a contact.

While automatic control systems, having such "memory" systems have been devised, the "memory period" of the memory systems was relatively short. On the other hand, it is often desirable or necessary that the memory system be operative for a relatively long and indefinite period of time, such where the relative advancing of the control member occurs infrequently or at a slow speed.

A final desirable feature of automatic control systems of the present type is that they be capable of automatically terminating operation of a controlled machine in response to completion of the sequence of operations recorded on the control member.

With the foregoing preliminary discussion in mind, a broad object of this invention may be stated as being the provision of an improved automatic control system of the character described.

A more specific object of the invention is the provision of an automatic control system of the character described wherein initial relative advancing of the presettable control member of the system past the sensing device, to align the latter with the first control set of the control member, is accomplished automatically.

Another object is the provision of an automatic control system as in the foregoing which is capable of deactivating the controlled machine during initial relative advancing of the control member to the first control set.

Yet another object is the provision of an automatic control system of the character described having an improved memory system for maintaining each preselected actuation of the control system for indefinite periods of time.

A further object is the provision of an automatic control system of the character described which is effective to automatically stop a controlled machine upon completion of the sequence of operations recorded on the preset control member.

Yet a further object is the provision of an automatic control system of the character described which operates to effect preselected actuation of a plurality of controlled elements in response to the coding or presetting of each of a series of control sets on a control member and wherein automatic initial advancing of the control member and shut down of the equipment occurs in response to predetermined conditions of the control member.

A still further object of the invention is the provision of an automatic control system of the character described which is ideally suited for controlling printing light intensity in a film printer.

Other objects, advantages and features of the invention will become readily apparent as the description proceeds.

For illustrative purposes, the invention will be described with reference to its use in motion picture film printing machines for correcting the printing light intensity from one scene to the next.

In the illustrated embodiment of the invention, a control tape, prepunched with coded sets of light change perforations in accordance with the varying densities of the several scenes of a negative film, is intermittently advanced past a tape reader, in response to cueing notches in the film, to sequentially align said perforation sets with the reader. The control system of the invention incorporates a series of relays which are selectively operated, in accordance with the coding of each set of perforations, to establish predetermined light intensities in the film printing machine.

The control system is operative in response to the absence of perforations in the blank leader portion of the tape to initially continuously advance the tape past the reader to a first set of perforations. Also embodied in the present control system are means for stopping the printer automatically when the tape is advanced to a perforation set having a predetermined coding.

A highly important and advantageous feature of the control system resides in the provision of a memory system which has a memory period of indefinite length and which is operative to maintain a given printing light intensity even though the reader contacts fail and during advancing of the tape to align a following perforation set with the reader.

A better understanding of the invention may be had from the following detailed description taken in connection with the annexed drawings, wherein.

Figure 3:
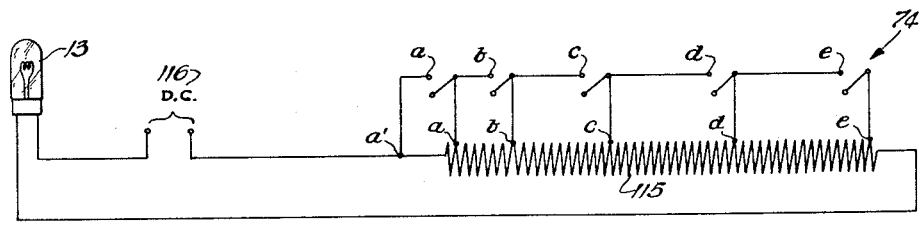

FIG. 3 schematically illustrates a modified form of light change device to be used with the control system.

Figure 1:
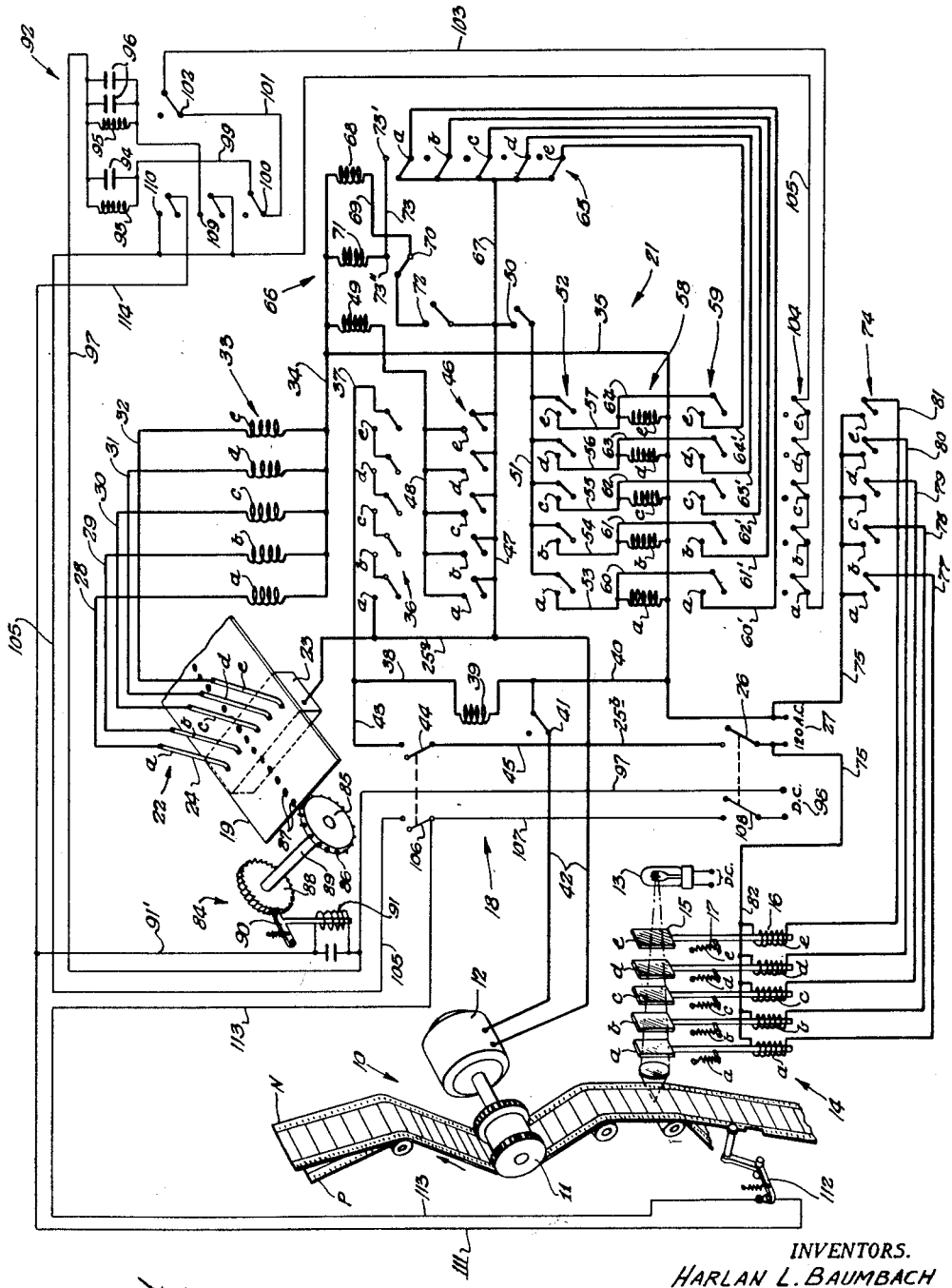
FIG. 1 is a schematic circuit diagram of the invention in a film printer.

Referring first to FIG. 1, the numeral 10 denotes the film feed mechanism of a film printer including a sprocket wheel 11 and drive motor 12 therefor for advancing a negative film strip N and a positive film strip P through a beam of light from a source 13. The beam of light passes through the negative film strip and impinges on the positive film strip so as to produce on the latter latent positive images of the negative images contained on the negative film strip N.

In the printer illustrated in FIG. 1, the intensity of the beam of light from source 13 at the film strips P and N is controlled by a variable density light filter arrangement 14 including a series, shown as five in number, of varying density light filter elements 15, separately designated as $a, b, c, d, e$. These filter elements are normally disposed in the path of said beam, between source 13 and the film strips P and N, and adapted to be selectively removed therefrom either singly or in combination. Each of the filter elements 15 is of different predetermined light density so that by such selective individual or combined removal of the filters, different light intensities may be provided at the film strips, as will presently be more fully explained.

Associated with each of the filter elements 15 is a solenoid actuating element 16 which when energized will move its respective filter element out of the path of the printing light beam. The filter elements are normally retained in a position in such path, for example, by means of biasing springs 17 on the solenoids 16.

Automatic selective energization of the solenoids 16 to achieve predetermined light changes during the operation of the printer 10 is accomplished by operation of the present control system, generally denoted at 18. This control system comprises a preformed control member 19 (see also FIG. 2), for example, which may be a tape punched with sets 20 of light change perforations, and an electrical circuit 21 including a tape reader or sensing device 22 for sensing the perforations or other indications in each of the sets 20 in the control tape 19 and effecting selective energization of the light filter solenoids 16 in accordance with the perforations present in any given one of the perforation sets 20. Solenoids 16, then, comprise the controlled elements which are to be selectively actuated by the present control system.

Figure 2:
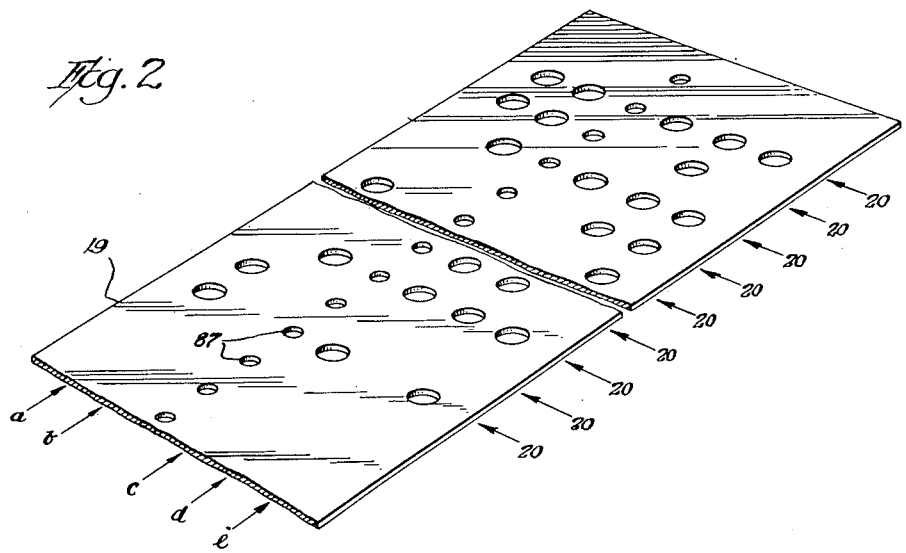
FIG. 2 is an enlarged showing of the control tape used in the invention.

As shown in FIG. 2, each of the perforation sets 20 has five positions, designated as $a, b, c, d, e$, in which a perforation may be formed, each of said positions being identified with the correspondingly lettered one of controlled elements, namely the light filter solenoids 16. As will presently be more fully described, the arrangement of circuit 21 is such that a perforation in position "$a$" will result in energization of filter solenoid $16a$, a perforation in position "$b$" will result in energization of filter solenoids $16b$, and so forth.

While each of the perforation sets 20 have been illustrated as containing a maximum of five perforations for the selective control of five light change filters, it will be apparent that the maximum number of perforations in each of the sets 20 may be varied according to the number of elements to be controlled.

Circuit 21 of the present control system will now be described in greater detail. It will become readily apparent as the description proceeds that various types of control members and sensing devices, other than a punched tape and tape reader, as illustrated, may be used in the control system. Where a punched tape is utilized as the control member 19, as shown, sensing device 22 may comprise any conventional punched tape reader. For the purpose of illustration, the reader 22 is shown as comprising a metallic platen 23 and five flexible contact brushes 24 individually designated as $a, b, c, d, e$, arranged to normally contact the platen. As will be seen, tape 19 is, during operation of the system, fed between platen 23 and brushes 24 so that contact will be established between the brushes and the platen only in the presence of a corresponding perforation in the tape.

Platen 23 is connected, through leads $25a$, $25b$, and a series connected switch 26, to one terminal of an A.C. supply 27. Brushes $24a$ through $24e$ are connected, respectively, through leads 28, 29, 30, 31 and 32 to one terminal of a series of five relay coils $33a$–$33e$. The other terminals of the coils 33 are connected through a common lead 34 and a lead 35 to the other terminal of the A.C. supply 27.

It will be apparent from the foregoing description that when switch 26 is closed, relay coils 33 will be energized whenever their respective brushes 24 contact the platen 23.

Relays 33 comprise a first set of normally open, series connected contacts $36a$–$36e$. When all of these latter contacts are closed by simultaneous energizing of the five relays 33, a circuit is completed from lead $25a$ through leads $25a$, 37, contacts 36, lead 38, a relay coil 39, and lead 40 to the other terminal of supply 27. Thus, when switch 26 and all of the contacts 36 are closed, relay 39 energizes to open its normally closed contacts 41. These contacts 41 are connected in the energizing circuit 42 for film feed motor 12 so that energization of the relay 39 results in stoppage of the feeding of the film strips N and P through the printer 10. Arranged in shunt with the relay contacts 36 is a circuit comprising a lead 43, extending from lead 38 for relay 39 to one terminal of a switch 44, and a lead 45 extending from the other terminal of switch 44 to A.C. supply lead $25b$. It will be seen that when switch 44 is closed, relay contacts 36 are bypassed and relay 39 energizes. This switch 44 is initially closed to prevent the printer motor 12 from starting, for reasons to be presently described.

Relays 33 comprise a second set of normally open, parallel connected contacts $46a$–$46e$. Closing of any one of these contacts by energization of its respective relay coil 33 completes a circuit from one terminal of A.C. supply 27, through leads $25b$, $25a$, 47, contacts 46, lead 48, a relay coil 49, and leads 34 and 35 to the A.C. supply 27 to energize the relay 49.

Relay 49 comprises a first set of normally open contacts 50 which, when closed by energizing of coil 49, connect lead 47 to a lead 51. Lead 51 extends to a third set of normally open parallel arranged contacts $52a$–$52e$ of the relays 33. These latter relay contacts 52 are connected, through leads 53, 54, 55, 56 and 57, respectively, to one of the terminals of a second set of five relay coils $58a$–$58e$. The other terminals of coils $58a$–$58e$ are connected to lead 35 extending to the A.C. supply. Thus, it will be evident that energization of any one of the first set of five relays 33 results in the energization of the corresponding one of the second set of five relays 58. This latter energizing circuit may be traced from one terminal of the A.C. supply 27, through leads 25b, 25a, 47, contacts 50 closed, as above described upon energization of any one of the relays 33, lead 51, contacts 52 corresponding to the energized relay 33, relay coils 58, and thence to the other terminal of A.C. supply 27 through lead 35.

A series of normally open lock-in contacts 59a–59e are associated with the second set of five relays 58 for maintaining the latter in an energized state once they are energized by energization of the corresponding relays 33. To this end the lock-in contacts 59a–59e have one terminal connected via leads 60, 61, 62, 63 and 64, respectively, to the upper ends of their associated relay coils 58a–58e. The other terminals of contacts 59a–59e are connected through leads 60', 61', 62', 63', 64', respectively, to a series of five normally closed, parallel arranged contacts 65a–65e, in an A.C. pulse circuit 66. Contacts 65 are connected through leads 67, 47, 25a and 25b to one terminal of A.C. power supply 27. Thus, with the lower ends of coils 58 connected to the other terminal of supply 27 and with the contacts 65 closed, closing of any one of the lock-in contacts 59 by energizing of the corresponding relay 58 operates to lock such corresponding relay in its energized condition. As will presently be more fully described, the lock-in contacts 59 and their associated leads comprise the previously mentioned memory circuit which constitutes a highly important feature of the invention. Thus, during advancing of tape 19 from one set 20 of perforations to the next following perforation set 20, contact between all of the brushes and the platen 23 is momentarily broken. In the absence of the present memory circuit, therefore, all of the filters 15 would be momentarily returned to their normal positions in the path of the printing beam so that during this period, the positive film P would be improperly exposed.

The lock-in contacts 59 act to maintain those filter solenoids 16, corresponding to the perforations in a preceding perforation set, energized during advancing of the tape 19. Accordingly, during this transit of the tape, the corresponding filters 15 remain out of the path of the beam and the positive film will be properly exposed. Moreover, these lock-in contacts act to maintain the predetermined printing beam intensity, even though the contacts 24 of the tape reader fail after initial contact with the platen 23.

It will be seen that the lock-in contacts 59 remain operative so long as they are supplied with energizing current. Thus, the present memory circuit may be considered to have a memory period of indefinite length. This prolonged memory period may be important, for example, where relatively slow or widely varying tape advance speeds are used under various conditions or where a reader contact fails at the beginning of printing a relatively long scene. Also the printer may be stopped and the reader rendered inoperative for prolonged periods of time and subsequently their operation continued without interruption of the memory circuit.

The A.C. pulse circuit 66 provides for opening the lock-in contacts 59 under certain hereafter described conditions. To this end the contacts 65 comprise a relay whose coil 68 has one terminal connected to the A.C. supply lead 34 and the other terminal connected through a lead 69, a set of normally closed contacts 70 of a relay 71, and a second set of normally open contacts 72 of the relay 49 to lead 47. One terminal of relay coil 71 is connected to the A.C. supply lead 34 while its other terminal is connected through a lead 73 to normally open contact points 73' and 73" associated with normally closed contacts 65 and 70. Contacts 73" close upon opening of contacts 70, by energizing of coil 71, and contacts 73' close upon opening of contacts 65 by energization of relay 68. Operation of this lock-in releasing A.C. pulse circuit will be described presently.

Associated with the relay coils 58 are a second set of normally open contacts 74a–74e. The upper terminals, as viewed in the drawing, of these contacts are connected through a common lead 75 to one terminal of A.C. power supply 27. The lower terminals of the contacts 74 are connected through leads 77, 78, 79, 80 and 81 to the lower ends of light change solenoids 16. The upper ends of these latter solenoids are connected to the other terminal of supply 27 through a common lead 82. Printing light 13 may be energized from a D.C. supply as indicated.

As will be more fully described, contacts 74 effect the actual light intensity changes in the printer. Thus, closing of any one of the contacts 74 by energizing of the associated relay 58 completes a circuit from the supply 27 to the corresponding light filter solenoid 16 to energize the latter and move the corresponding filter 15 out of the path of the printing light beam.

Indicated generally at 84 is any conventional mechanism for advancing tape 19 past reader 22 during operation of the system. This mechanism is schematically illustrated as comprising a sprocket wheel 85 formed with teeth 86 for engaging sprocket holes 87 in the tape. Wheel 85 is coupled to a ratchet wheel 88 by a shaft 89 so that rotation of wheel 88 imparts rotation to wheel 85.

A spring biased pawl 90, arranged to engage the teeth of ratchet wheel 88, is operated by a solenoid 91. The arrangement is such that each time solenoid 91 is energized, pawl 90 is operated downwardly to step ratchet wheel 88 and cause advancing of tape 19 through a predetermined distance. This distance is made equal to the spacing between the sets 20 of perforations in the tape.

Solenoid 91 is energized through a D.C. circuit, whose conductors are, in the interest of clarity, illustrated by relatively fine lines as compared to the conductors of the A.C. circuit heretofore described.

This D.C. energizing circuit comprises a D.C. "pulse" circuit 92 which, in the absence of any perforations in tape 19, feeds the tape advance solenoids 91, a series of pulses for continuously advancing the tape past the tape reader 22 to the first set of perforations. D.C. pulse circuit 92 comprises a first coil 93 shunted by a first condenser 94 and a second coil 95 shunted by a pair of condensers 96.

These coils and condenser 93–96 have one terminal connected through a common lead 97 to one terminal of a D.C. supply 98. First coil and condenser 93 and 94 have their other terminal connected to the other terminal of the D.C. supply 98 through a circuit which may be traced through lead 99, a set of normally closed contacts 100 of the first coil 93, lead 101, a set of normally closed contacts 102 of the second coil 95, lead 103, a third set of series connected, normally closed, contacts 104a–104e of the relays 58a–58e, lead 105, switch 106, lead 107, and switch 108 to said other terminal of the D.C. supply 98. Switches 44 and 106 and switches 26 and 108 are tied together for simultaneous operation thereof, as indicated.

The other terminal of the shunt connected coil and condenser assembly 95 and 96 is adapted to be connected to D.C. supply connected lead 105 by closing of a second set of normally open contacts 109 operated by first coil 93. A third set of normally open contacts 110 of this latter coil, when closed, connect lead 105 to a lead 11 extending to one terminal of a film-operated switch 112. The other terminal of this latter switch is connected, via leads 113 and 107, to the D.C. supply 98. The tape advance solenoid 91 is series connected in a lead 91' tied at opposite ends to leads 111 and 97.

*Operation*

Negative film N will have been initially viewed in its entirety by an operator who will form in the film, at each point where a change in printing light intensity is to occur, a notch 114. Simultaneously he will form in the control tape 19, properly coded sets 20 of perforations wherein the perforations will be present in one or more of the previously mentioned positions $a$–$e$ depending on which of the filters 15 must be removed from the path of the printing light beam to yield the desired light intensity at the film.

The leading end of this prepunched tape is inserted into reader 22 to engage sprocket holes 87 with the sprocket wheel 85, the tape passing between the platen 23 and brushes 24. Normally the first set 20 of light change perforations will be spaced some distance from the leading end of the tape so that the latter must be initially advanced a substantial distance through the reader to align the first set of perforations with the reader brushes 24.

To effect this initial advancing of the tape, switches 44 and 106 are moved to their right hand, closed position, and switches 26 and 108 are closed to energize the control circuit for the tape advancing mechanism 84. A.C. supply 27 will thereby also be connected to the control circuit for the light filter solenoids 16 and film feed motor 12. However, since the blank leader portion of the tape 19 now separates brushes 24 from platen 23, relays 33 and 58 remain deenergized. Moreover, closing of the switch 44 completes a circuit through the motor control relay 39, so that when switch 26 is closed, relay 39 energizes to open contacts 41 for film feed motor 12. The printer 10, therefore, remains inoperative.

Since relays 58 are deenergized, contacts 104 are closed so that a circuit may be traced from the right hand terminal of D.C. supply 98, through lead 97, coil 93, lead 99, contacts 100, lead 101, contacts 102, lead 103, contacts 104, lead 105, switch 106, lead 107, switch 108 to the other terminal of the D.C. supply. Coil 93 is thereby energized to close its normally open contacts 109 and 110 and open its normally closed contacts 100.

Closing of contacts 110 completes a circuit from D.C. supply 98 through switch 108, lead 107, switch 106, lead 105, contacts 110, lead 111, lead 91', tape advance coil 91, and thence back to the other terminal of supply 98 through lead 97. Coil 91 thus energizes to actuate the tape advance mechanism 84 and cause advancing of the tape 19 a distance equal to the spacing between adjacent sprocket holes 87.

Simultaneously with the closing of contacts 110, contacts 109 open to break the circuit between coil 93 and D.C. supply 98 and contacts 109 close to complete a circuit from D.C. supply connected lead 97 through coil 95 to D.C. supply lead 105. Coil 95, therefore, energizes and its normally closed contacts 102 open.

Although the energizing circuit to coil 93 is broken by opening of its contacts 100, discharge of condenser 94 through said coil maintains the latter energized sufficiently long to deliver a D.C. pulse to tape advance coil 91 and effect opening of contacts 102 of coil 95.

After condenser 94 has discharged through coil 93, to a given value, its contacts 109 and 110 reopen and its contacts 100 reclose. Reopening of contacts 109 breaks the energizing circuit to coil 95, but the latter remains energized for a brief period of time sufficient to allow the advance mechanism to return to its normal position under the action of the biasing spring therein.

Accordingly, reclosure of contacts 100 does not instantaneously result in energization of coil 93 inasmuch as contacts 102 will be held open by this prolonged energization of the coil 95.

After condensers 96 have discharged through their associated coil 95 to a predetermined value, contacts 102 reclose and coil 93 reenergizes to repeat the above-described cycle. Thus, it may be seen that the D.C. pulse circuit 92 operates to deliver a series of D.C. pulses to the tape advance coil 91 and the tape 19 will be continously intermittently advanced past the reader 22.

This intermittent advancing of the tape continues until the first of the sets 20 of light change perforations become aligned with the reader brushes 24. At that time, one or more of the brushes 24, depending on the perforations present in the first set, contact the platen 23 through such perforations. As will now be described, this contact of any one of the brushes with the platen results in energizing of the corresponding relay 58 and opening of its contacts 104. Opening of any one of the contacts 104 breaks the energizing circuit to the coil 93 in D.C. pulse circuit 92 and the latter will cease to operate. Thus, the tape will stop when the first set fo perforations becomes aligned with the reader brushes 24.

This initial contact between one or more of the reader brushes 24 and platen 23 also establishes an initial printing light intensity at the film strip N in the following manner. Assuming that the first perforation set 20 on the tape 19 contains only a perforation in position $a$ so that only brush 24$a$ contacts the platen, relay coil 33$a$ becomes energized and its normally open contacts 36$a$, 46$a$ and 52$a$ close.

Closure of contacts 46$a$ places the A.C. supply 27 across relay coil 49 to energize the latter and close its normally open contacts 50. Closure of contacts 50 and 52$a$ completes a circuit from A.C. supply 27 through relay coil 58$a$ to energize the latter and close its normally open contacts 59$a$ and 74$a$ and open its normally closed contacts 104$a$. As described above, opening of contacts 104$a$ results in interruption of the D.C. pulse circuit 92.

Contacts 59$a$ act to lock-in relay coil 58$a$ so that the latter remains energized and its contacts 74$a$ remain closed. These latter contacts 74$a$ complete a circuit from the right hand terminal of A.C. supply 27 through lead 75, contacts 74$a$, lead 77, light filter solenoids 16$a$, and lead 82 to the other terminal of source 27. Solenoid 16$a$ is thus energized to retract light filter 15$a$ out of the printing beam.

Similarly, if the first of the perforation sets 20 contains perforations in any of the other positions $b$–$e$, the corresponding filter elements 15$b$–15$e$ will be removed from said beam.

Thus, the intensity of the light impinging on the film will be increased in accordance with the light density of a single filter, where only one filter is removed, or in accordance with the combined light density of several filters where more than one filter is removed from the light beam.

Printing light 13 is now energized and simultaneously switches 44 and 106 are operated to their open position. Opening of switch 44 results in breaking of the previously described energizing circuit for motor relay 39 whereupon its normally closed contacts 41 reclose to complete a circuit from the left hand terminal of A.C. supply 27, through switch 26, leads 25$b$ and 42, feed motor 12, contacts 41, and lead 40 to the right hand terminal of supply 27.

The positive and negative film strips P and N are fed, by operation of motor 12, in the direction indicated to successively expose the frames of the negative film to the beam which now has an intensity, corresponding to the perforations present in the first perforation set.

As the first one of the notches 114 passes the interrupter switch 112, the latter is momentarily closed, by movement of the roller carried on the switch rocker arm into the notch, and a circuit is momentarily established from the left hand terminal of D.C. supply 98, through now closed switch 108, leads 107 and 113, switch 112, leads 111 and 91', tape advance solenoid 91 and lead 97 to the right hand terminal of the D.C. supply.

Tape 19 is thereby advanced to align the second set of perforations 20 with the reader brushes 24. Contact with platen 23 of those of the brushes 24$a$–24$e$ corresponding to perforations present in the second set of perforations results in the energization of the corresponding ones of the light filter solenoids 16$a$–16$e$ and removal of the associated filter elements 15$a$–15$e$ from the path of the printing light beam to achieve the proper beam intensity for the second scene of the negative film.

If a perforation in one set of perforations is absent from the next following set, A.C. operation of pulse circuit 66 releases the lock-in contacts 59 associated with that perforation to permit return of the corresponding filter element 15 to its normal position.

Thus, for example, assuming that the first perforation set contained a perforation in position *a* and that the second perforation set contained a perforation only in position *b*, relays 33*b* and 58*b* energize due to contact of brush 24*b* with platen 23. Resultant closing of contacts 46*b* of relay 33*b* energizes relay 49 to close its normally open contacts 72 whereupon a circuit may be traced from lead 47, extending to the left hand terminal of A.C. supply 27, through contacts 72, normally closed contacts 70, lead 69, relay coil 68 to lead 34 extending to the other terminal of the supply 27. Relay 68 is thereby energized and its normally closed contacts 65*a*–65*e* open, thus breaking the energizing circuit through lock-in contacts 59*a* for relay 58*a*. This latter relay now becomes deenergized and its contacts 74*a* and lock-in contacts 59*a* open allowing light filter 15*a* to be reinserted under the action of the associated biasing spring 17. Relay 58*a*, therefore, remains deenergized until subsequent contact is established between brush 24*a* and platen 23 due to the presence of a perforation being present in position *a* in a succeeding set of perforations.

Relay 58*b*, however, remains energized by virtue of the contact between brush 24*b* and platen 23. Simultaneously with the opening of contacts 65*a* by energizing of coil 68, normally open contacts 73' of coil 68 close to complete a circuit from A.C. supply lead 67 through contacts 73', lead 73, relay coil 71 to lead 34 to the right hand terminal of the supply 27.

Relay coil 71 is thereby energized and its normally closed contacts 70 open to break the energizing circuit to relay 68 and allow its contacts 65*a*–65*e* to return to their normal closed condition whereupon the lock-in contact 59*b* of relay coil 58*b* becomes operative to maintain the latter coil energized during subsequent advancing of the tape and even though the contact between brush 24*b* and platen 23 subsequently fail.

Contacts 73" of relay coil 71 close simultaneous with the opening of its contacts 70 so that coil 71 is locked in energized condition as long as contacts 72 are retained closed by energization of relay 49. This latter relay is momentarily deenergized during advancing of tape 19 from one set of light change holes 20 to the next, since during this transit none of the brushes 24 will contact the platen and accordingly all of the contacts 46 open momentarily. This momentary deenergizing of coil 49 opens contacts 72 and deenergizes coil 71. This allows contacts 73" of relay 71 to reopen and contacts 70 to reclose so as to condition the A.C. pulse circuit for repetition of the above described operation when the next set of light change holes in tape 19 become aligned with the brushes 24.

Tape 19 will continue to be advanced to sequentially align the sets 20 of light change holes in the tape with the brushes 24 each time one of the cueing notches 114 in the film passes interrupter switch 112. As each of said sets of holes 20 become aligned with the brushes, the system operates in the manner described above to remove from between the printing light source 13 and the film one or more of the light filters 15 in accordance with the perforations present in each set.

The system will continue to operate in this manner until the tape is advanced to a position wherein the set of perforations aligned with the reader 22 contains a perforation in each of the positions *a*–*e*. This condition of all five perforations being present results in energizing of all five relays 33 and, accordingly, in closure of all five contacts 36*a*–36*e*. A circuit is then completed from A.C. supply 27 through motor relay 39. The latter energizes to open its normally closed contacts 41 and stop film feed motor 12.

Tape 19 will be deliberately punched with all five perforations to stop the printer at the completion of a printing operation.

The present control system may also be used with a printer having a variable resistance printing light change in lieu of the variable density filter arrangement just described. In this variable resistance arrangement, shown in FIG. 3, contacts 74*a*–74*e* of relays 58 operate to remove varying amounts of resistance in series with the printing lamp 13. In FIG. 3, only the contacts 74, resistance element 115, lamp 13 and a D.C. supply 116 have been illustrated, in the interest of clarity, it being understood that the remainder of the light change system would be identical to that described.

As shown in FIG. 3, with all of the contacts 74*a*–74*e* open, which position they will occupy when all of the relays 33 and 58 are deenergized due to no light change perforations being present in the tape 19, a circuit may be traced from the left hand terminal of supply 116, lamp 13, and resistance element 115 to the right hand terminal of said supply. The intensity of the light emitted from the lamp will, therefore, have a minimum value.

As shown, the contacts 74*a*–74*e* are series connected and are tapped to the resistance element 115 at five points designated as *a*–*e*, the first contact 74*a* having one terminal tapped at *a'* to the lead extending to the supply 116. The distance between taps gradually increases so that, for example, the resistance value between taps *a* and *b* will be a multiple of the resistance value between taps *a'* and *a*, the resistance value between taps *b* and *c* will be a multiple of that between taps *a* and *b*, and so forth.

The arrangement is such that when contacts 74*a* are closed, the resistance between taps *a'* and *a* is shunted, when contacts 74*b* are closed the resistance between taps *a* and *b* is shunted, and so on. Thus, successive closing of the contacts 74*a*–74*e*, in that order, will produce incremental increases in the printing light intensity, which intensity may be further increased by closing two or more of the contacts in desired combination.

The operation of the system when incorporating the above described resistance change is the same as that previously set forth with respect to the system utilizing variable density light filter elements. No further description thereof is, therefore, deemed necessary.

As preliminarily indicated, the above described use of the present control system on a film printer is intended to be illustrative rather than limiting in nature. It will be obvious that the control system has a wide variety of other uses and applications and may be regarded as having general utility in the field of automatic control.

Accordingly, the invention is intended to be limited only by the spirit and scope of the following claims.

We claim:

1. In an automatic control system, the combination of a control tape having a blank leader portion and a trailing portion formed with coded groups of control perforation, a tape reader including electrical feed means for feeding said tape through the reader and a group of electrical contacts which remain open in the absence of control perforations in the portion of the tape aligned with the reader and are selectively closed when a coded group of perforations is aligned with said reader, a group of relays each associated with a particular reader contact, means including said reader contacts for energizing each relay in response to closure of its respective reader contact, each relay including a first set of normally open holding contacts, a holding circuit including said relay holding contacts for locking each relay in its energized state upon closure of its respective holding contacts, each relay including a second set of contacts which occupy a first position when the respective relay is energized and a second position when the respective relay is deenergized, an electrical circuit including the second sets of contacts of said relays for energizing said feed means to continuously feed said tape through said reader when all of the second sets of contacts occupy said first position and deenergizing said feed means to terminate feeding of said tape through said reader upon movement of any one or more of said second sets of contacts to said second position, whereby said blank leader portion of the tape is continuously fed through the reader to the first coded group, means for thereafter selectively energizing said feed means to advance said tape through said reader from one coded group to the next, and means for momentarily opening said holding circuit in response to opening of said reader contacts during advancing of said tape from each coded group to the following coded group and subsequent closure of any one or more of the reader contacts by said following coded group.

2. In an automatic control system, the combination of a control tape having a blank leader portion and a trailing portion formed with coded groups of control perforations, a tape reader including electrical feed means for feeding said tape through the reader and a group of electrical contacts which remain open in the absence of control perforations in the portion of the tape aligned with the reader and are selectively closed when a coded group of perforations is aligned with said reader, a group of relays each associated with a particular reader contact, means including said reader contacts for energizing each relay in response to closure of its respective reader contact, each relay including a first set of normally open holding contacts, a holding circuit including said relay contacts for locking each relay in its energized state upon closure of its respective holding contacts, each relay including a second set of normally closed contacts, an electrical circuit including the second sets of contacts of said relays for energizing said feed means to continuously feed said tape through said reader when all of the second sets of contacts are closed and deenergizing said feed means to terminate feeding of said tape through said reader upon opening of any one or more of said second sets of contacts, whereby said blank leader portion of the tape is continuously fed through the reader to the first coded group, means for thereafter selectively energizing said feed means to advance said tape through said reader from one coded group to the next, and means for momentarily opening said holding circuit in response to opening of said reader contacts during advancing of said tape from each coded group to the following coded group and subsequent closure of any one or more of the reader contacts by said following coded group.

3. In an automatic control system, the combination of a control tape having a blank leader portion and a trailing portion formed with coded groups of control perforations, a tape reader including electrical feed means for feeding said tape through the reader and a group of electrical contacts which remain open in the absence of control perforations in the portion of the tape aligned with the reader and are selectively closed when a coded group of perforations is aligned with said reader, a group of relays each associated with a particular reader contact, means including said reader contacts for energizing each relay in response to closure of its respective reader contact, each relay including a first set of normally open holding contacts, a holding circuit including said relay contacts for locking each relay in its energized state upon closure of its respective holding contacts, each relay including a second set of normally closed contacts, an electrical circuit including the second sets of contacts of said relays connected in electrical series therein for energizing said electrical feed means to continuously feed said tape through said reader when all of the second sets of contacts are closed and deenergizing said electrical feed means to terminate feeding of said tape through said reader upon opening of any one or more of said second sets of contacts, whereby said blank leader portion of the tape is continuously fed through the reader to the first coded group, means for thereafter selectively energizing said electrical feed means to advance said tape through said reader from one coded group to the next, and means for momentarily opening said holding circuit in response to opening of said reader contacts during advancing of said tape from each coded group to the following coded group and subsequent closure of any one or more of the reader contacts by said following coded group.

4. In an automatic control system, the combination of a control tape having a blank leader portion and a trailing portion formed with coded groups of control perforations, a tape reader including electrical feed means for feeding said tape through the reader and a group of electrical contacts which remain open in the absence of control perforations in the portion of the tape aligned with the reader and are selectively closed when a coded group of perforations is aligned with said reader, a group of first relays each associated with a particular reader contact, means including said reader contacts for energizing each relay in response to closure of its respective reader contact, a group of second relays each associated with a particular first relay, means including a set of contacts in each first relay for energizing the associated second relay in response to energizing of the respective first relay, each second relay including a first set of normally open holding contacts, a holding circuit including said holding contacts for locking each second relay in its energized state upon closure of its respective holding contacts, each second relay including a second set of contacts which occupy a first position when the respective second relay is deenergized and a second position when the respective second relay is energized, an electrical circuit including the second set of contacts of said second relays for energizing said feed means to continuously feed said tape through said reader when all of the second sets of contacts of said second relays occupy said first position and for deenergizing said feed means to discontinue feeding said tape through said reader in response to movement of any one or more of said latter sets of contacts to said second position, whereby said blank leader portion of the tape is continuously fed through the reader to the first coded group, means for thereafter selectively energizing said feed means to feed said tape from one coded group to the next, and means including a second set of contacts in each first relay for momentarily opening said holding circuit in response to deenergizing of said first relays during feeding of the tape from one coded group to the following group and subsequent energizing of any one or more of said first relays by said following group.

5. In an automatic control system, the combination of a control tape having a blank leader portion and a trailing portion formed with coded groups of control perforations, a tape reader including electrical feed means for feeding said tape through the reader and a group of electrical contacts which remain open in the absence of control perforations in the portion of the tape aligned with the reader and are selectively closed when a coded group of perforations is aligned with said reader, a group of first relays each associated with a particular reader contact, means including said reader contacts for energizing each relay in response to closure of its respective reader contact, a group of second relays each associated with a particular first relay, means including a set of contacts in each first relay for energizing the associated second relay in response to energizing of the respective first relay, each second relay including a first set of normally open holding contacts, a holding circuit including said holding contacts for locking each second relay in its energized state upon closure of its respective holding contacts, each second relay including a second set of normally closed contacts, an electrical circuit including the second sets of contacts of said second relays connected in electrical series for energizing said electrical feed means to continuously feed said tape through said reader when all of the second sets of contacts of said second relays are closed and for deenergizing said electrical feed means to discontinue feeding said tape through said reader in response to opening of any one or more of said latter sets of contacts, whereby said blank leader portion of the tape is continuously fed through the reader to the first coded group, means for thereafter selectively energizing said electrical feed means to feed said tape from one coded group to the next, and means for momentarily opening said holding circuit in response to deenergizing of said first relays during feeding of the tape from one coded group to the following group and subsequent energizing of any one or more of said first relays by said following group.

References Cited in the file of this patent

UNITED STATES PATENTS

| | | |
|---|---|---|
| 2,354,733 | Baldwin | Aug. 1, 1944 |
| 2,439,497 | Tholstrup | Apr. 12, 1948 |
| 2,464,601 | Nichols | Mar. 15, 1949 |
| 2,543,435 | Buckley | Feb. 27, 1951 |
| 2,573,405 | Clark | Oct. 30, 1951 |
| 2,576,903 | Imm | Nov. 27, 1951 |
| 2,799,812 | Shively | July 16, 1957 |